(12) United States Patent
Nagai

(10) Patent No.: US 10,838,445 B2
(45) Date of Patent: Nov. 17, 2020

(54) CONSTANT-VOLTAGE POWER SUPPLY CIRCUIT

(71) Applicant: New Japan Radio Co., Ltd., Tokyo (JP)

(72) Inventor: Toshiyuki Nagai, Fujimino (JP)

(73) Assignee: New Japan Radio Co., Ltd., Tokyo (JP)

( * ) Notice: Subject to any disclaimer, the term of this patent is extended or adjusted under 35 U.S.C. 154(b) by 0 days.

(21) Appl. No.: 15/959,649

(22) Filed: Apr. 23, 2018

(65) Prior Publication Data

US 2018/0307260 A1 Oct. 25, 2018

(30) Foreign Application Priority Data

Apr. 25, 2017 (JP) .................................. 2017-085769

(51) Int. Cl.
*G05F 3/26* (2006.01)
*G05F 1/575* (2006.01)
(Continued)

(52) U.S. Cl.
CPC .............. *G05F 1/575* (2013.01); *G05F 1/573* (2013.01); *G05F 3/262* (2013.01); *H02M 3/156* (2013.01); *H02M 3/06* (2013.01)

(58) Field of Classification Search
None
See application file for complete search history.

(56) References Cited

U.S. PATENT DOCUMENTS 6,046,577 A * 4/2000 Rincon-Mora ......... G05F 1/575
323/279
6,150,871 A * 11/2000 Yee ........................... G05F 3/30
327/538
(Continued)

FOREIGN PATENT DOCUMENTS

CN 103149962 A 6/2013
CN 106292824 A 1/2017
JP 2010-079653 A 4/2010

OTHER PUBLICATIONS

Tutorials Point, "VLSI Design-MOS Inverter", Apr. 19, 2016, Tutorials Point Simply Easy Learning, pp. 1-10. (Year: 2016).*

*Primary Examiner* — Jeffrey A Gblende
(74) *Attorney, Agent, or Firm* — Arent Fox LLP; Michael Fainberg

(57) ABSTRACT

According to one embodiment, a constant-voltage power supply circuit includes: an error amplifier including an inverting input terminal and a noninverting input terminal, a reference voltage source connected with the inverting input terminal of the error amplifier, an output transistor, the transistor having a source connected with a power supply terminal, a drain connected with a circuit output terminal, and a gate connected with an output terminal of the error amplifier, and an output voltage detecting circuit, the circuit being connected between the circuit output terminal and a power supply terminal, detecting voltage of the circuit output terminal to apply the detected voltage to the noninverting input terminal of the error amplifier. The constant-voltage power supply circuit further includes a positive feedback circuit connected between the output terminal of the error amplifier and the gate of the output transistor.

5 Claims, 6 Drawing Sheets

(51) Int. Cl.
*G05F 1/573* (2006.01)
*H02M 3/156* (2006.01)
*H02M 3/06* (2006.01)

(56) References Cited

U.S. PATENT DOCUMENTS

| | | |
|---|---|---|
| 6,300,749 B1 | 10/2001 | Castelli et al. |
| 2005/0151527 A1* | 7/2005 | Noda ................. G05F 3/242 323/313 |
| 2005/0231180 A1* | 10/2005 | Nagata ............... G05F 1/575 323/268 |
| 2010/0079121 A1 | 4/2010 | Yanagawa et al. |
| 2011/0095745 A1* | 4/2011 | Noda ................. G05F 1/565 323/315 |
| 2013/0119954 A1 | 5/2013 | Lo |
| 2015/0015222 A1* | 1/2015 | Ivanov ................ G05F 1/56 323/273 |
| 2017/0315574 A1* | 11/2017 | Brown ................ G05F 1/575 |

* cited by examiner

CONSTANT-VOLTAGE POWER SUPPLY CIRCUIT

CROSS-REFERENCE TO RELATED APPLICATIONS

This application is based upon and claims the benefit of priority from Japanese Patent Application No. 2017-085769, filed on Apr. 25, 2017, the entire contents of which are incorporated herein by reference.

FIELD OF THE INVENTION

Embodiments described herein relate generally to a constant-voltage power supply circuit offering favorable load regulation characteristics over an entire region of an output current.

BACKGROUND OF THE INVENTION

FIG. 5 illustrates a known constant-voltage power supply circuit 10E (see, for example, Japanese Patent Application Laid-open No. 2010- 079653). Reference numeral 1 denotes a high-potential power supply terminal having a voltage VDD. Reference numeral 2 denotes a low-potential power supply terminal having a voltage VSS (<VDD). Reference numeral 3 denotes a circuit output terminal having an output voltage VREG. Reference numeral 4 denotes a current source having a current IS. Reference numeral 5 denotes a reference voltage source having a voltage VR. Reference numerals MN4, MN5, and MN6 denote NMOS transistors constituting a differential circuit. Reference numerals MP3 and MP4 denote PMOS transistors having a current mirror connection and constituting an active load of the differential circuit. The transistors MN4 to MN6, MP3, and MP4 constitute an error amplifier 6. The error amplifier 6 has an inverting input terminal 61 connected with the reference voltage source 5. Reference numeral MN7 denotes an NMOS transistor having a current mirror connection with the transistor MN6. The NMOS transistor MN7 supplies the transistor MN6 with the current IS of the current source 4 as a bias current. Reference numeral MP1 denotes an output PMOS transistor having a gate connected with an output terminal 63 of the error amplifier 6 and a drain connected with the circuit output terminal 3. Resistors R3 end R4 constitute an output voltage detecting circuit 7 that detects the output voltage VREG. The resistors R3 and R4 are connected between the circuit output terminal 3 and the power supply terminal 2. The resistors R3 and R4 have a common connection point connected with a non inverting input terminal 62 of the error amplifier 6.

The output voltage VREG obtained by the constant-voltage power supply circuit 10E is as follows:

$$VERG = \frac{(R3+R4)}{R4} \cdot VR \quad (1)$$

Let us here consider a case. in which an output current is drawn from the circuit output. terminal 3.

Under a no-load condition having no output current, the transistor MP1 supplies only a current that flows through the resistors R3 and R4. Because a need generally exists to reduce current consumption as much as feasible, types of resistors having a high resistance value of several megaohms are incorporated for the resistors R3 and R4. At this time, the transistor MP1 that drives a load is controlled by the error amplifier so as to operate in a sub-threshold region. As the output current gradually increases, the transistor MP1 shifts to an operation in a saturation region. As the output current further increases, the transistor MP1 shifts to an operation in a non-saturation region and the output voltage VREG linearly decreases as an output current increases.

FIG. 6 illustrates output current characteristics. A characteristic B indicated by the solid line in FIG. 6 represents changes in the output voltage with respect to the output current of the constant-voltage power supply circuit 10E illustrated in FIG. 5. The output voltage characteristic serves as one of performance indices for the constant-voltage power supply circuit and constitutes an important factor for selecting the circuit.

In the characteristics illustrated in FIG. 6, in a region involving small output. currents, the transistor MP1 operates in the sub-threshold region as described previously, so that the voltage changes greatly. As the output current further increases, the transistor MP1 operates in the saturation region, exhibiting square characteristics with respect to the output current. The transistor MP1 eventually operates in the non-saturation region with the voltage linearly decreasing.

The foregoing output voltage characteristic can be represented by a load regulation characteristic. The load regulation characteristic is given by a degree of descending inclination of the output voltage VREG between two any given points I1 and I2 of the output current. The load regulation characteristic is typically defined by expression (2) given below:

$$LR = \frac{VR1 - VR2}{|I1 - I2|} \quad (2)$$

Where, VR1 denotes an output voltage when the output current is I1 and VR2 denotes an output voltage when the output current is I2. In FIG. 6, LRb denotes the load regulation characteristic of the constant-voltage power supply circuit 10E illustrated in FIG. 5.

As is known from FIG. 6, the load regulation characteristic needs to be improved in a region of low output currents before the load regulation characteristic can be improved over an entire region of the output current. The load regulation characteristic is considered to be more "favorable" with smaller values of LR in expression (2).

An object of the present invention is to provide a constant-voltage power supply circuit that offers improved load regulation characteristics as described above.

SUMMARY OF THE INVENTION

According to one embodiment, a constant-voltage power supply circuit includes: an error amplifier including an inverting input terminal and a noninverting input terminal, a reference voltage source connected with the inverting input terminal of the error amplifier, an output transistor, the transistor having a source connected with a power supply terminal, a drain connected with a circuit output terminal, and a gate connected with an output terminal of the error amplifier, and an output voltage detecting circuit, the circuit being connected between the circuit output terminal and a power supply terminal, detecting voltage of the circuit output terminal to apply the detected voltage to the noninverting input terminal of the error amplifier. The constant-voltage power supply circuit further includes a positive feedback circuit connected between the output terminal of the error amplifier and the gate of the output transistor.

DETAILED DESCRIPTION OF THE PREFERRED EMBODIMENTS

First Embodiment

Figure 1:
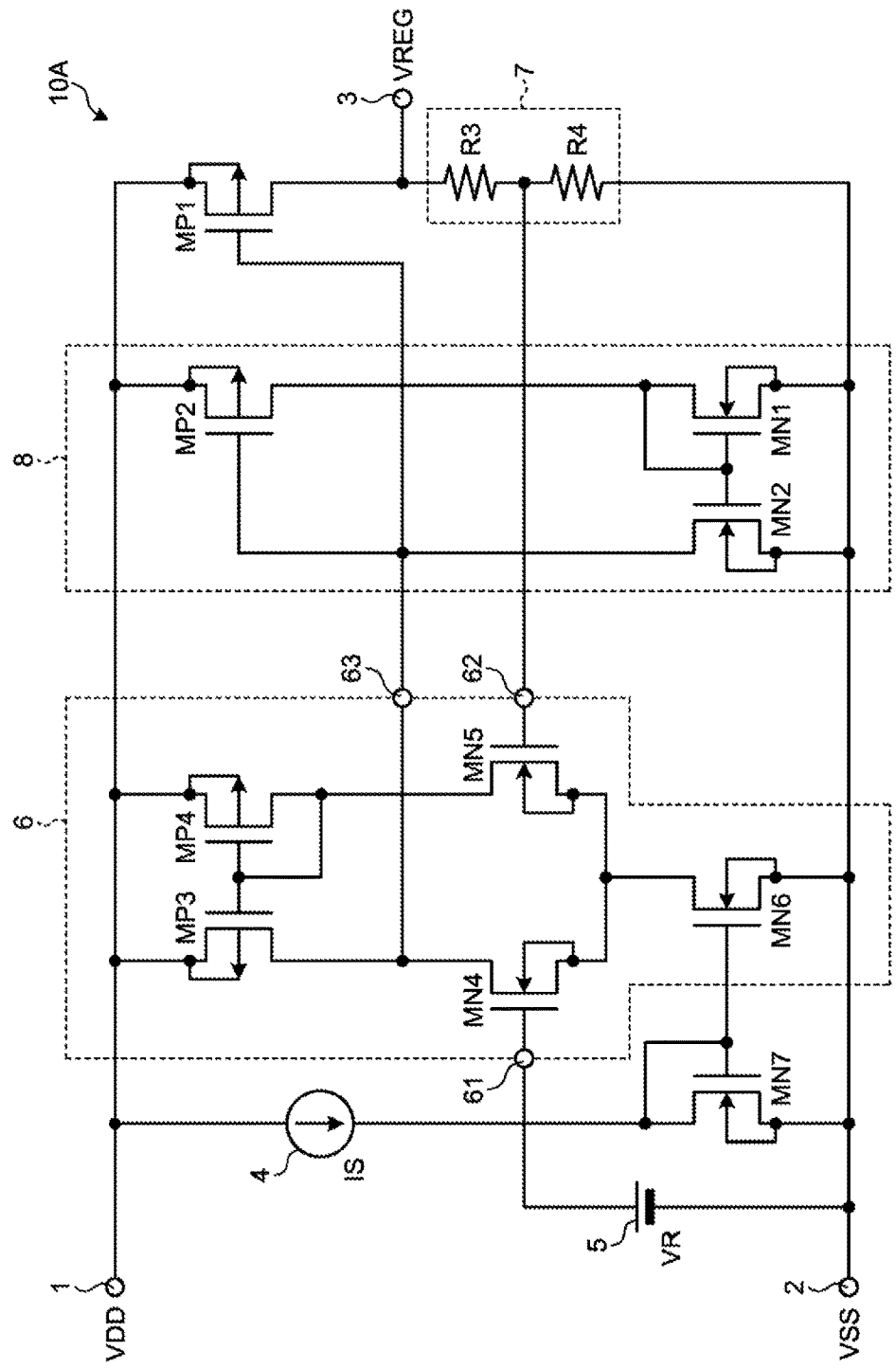
FIG. 1 is a circuit diagram of a constant-voltage power supply circuit according to a first embodiment of the present invention.

FIG. 1 illustrates a constant-voltage power supply circuit 10A according to a first embodiment of the present invention. In FIG. 1, like or similar elements are identified by like reference numerals used in FIG. 5 and descriptions of like or similar elements will be omitted. Reference numeral 8 denotes a positive feedback circuit that includes a PMOS transistor MP2 and NMOS transistors MN1 and MN2. The transistor MP2 has a source connected with power supply terminal 1 and a gate connected with an output terminal 63 of an error amplifier 6. The transistor MN1 has a gate and a drain connected with a drain of the transistor MP2 and a source connected with a power supply terminal 2. The transistor MN2 has a drain connected with the output terminal 63 of the error amplifier 6, a gate connected with the gate of the transistor MN1, and a source connected with the power supply terminal 2. The transistors MN1 and MN2 constitute a current mirror, so that a drain current in the transistor MP2 is duplicated in the drain of the transistor MN2.

The transistor MP2 has a gate length equal to a gate length of a transistor MP1. The transistor MP2 has a gate width set such that a ratio of the gate width of MP2 to the gate width of MP1 is 1 to n (n>1). Due to this setting, a drain current of the transistor MP2 is 1/n of a drain current of the transistor MP1.

The transistors MN1 and MN2 have gate widths set such that a ratio of the gate width of MN1 to the gate width of MN2 is m to 1 (m>1). Thus, when the drain of the transistor MN2 is connected with the of terminal 63 of the error amplifier 6, the transistor MN2 draws from the output terminal 63 of the error amplifier 6 a current of 1/(m×n) of an amount of current output from the transistor MP1, to thereby be able to transition greatly an output characteristic of the error amplifier 6.

As described above, in the constant-voltage power supply circuit 10A in the first embodiment, gain of the positive feedback circuit 8 is added to gain inherent in the error amplifier 6, so that a gate voltage of the transistor MP1 can be varied and the load regulation characteristic can be improved through the entire region of the output current.

Figure 5:
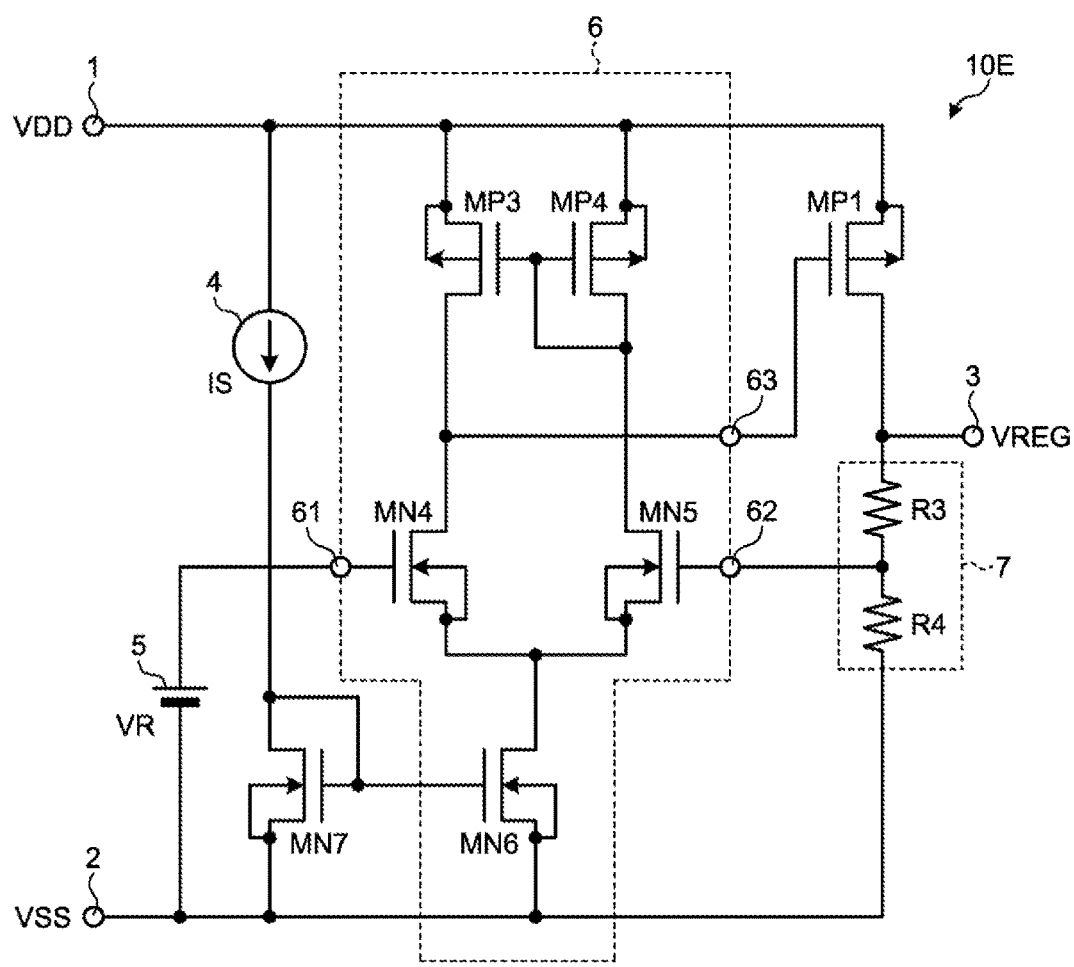
FIG. 5 is a circuit diagram of a constant-voltage power supply circuit according to a known art.
Figure 6:
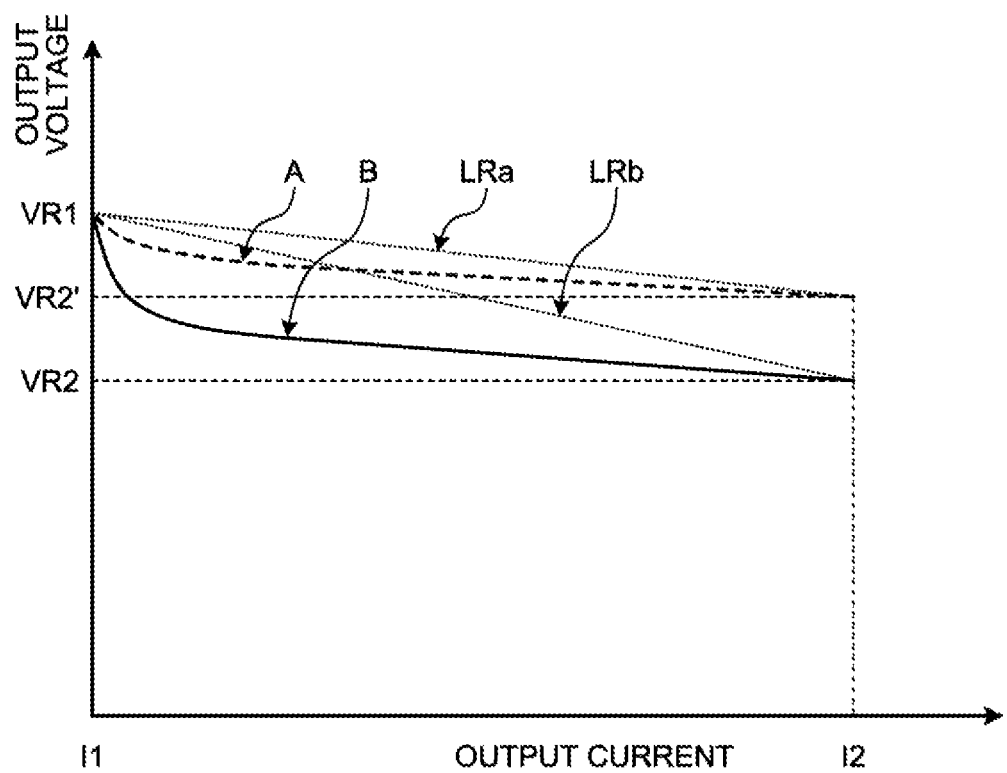
FIG. 6 is a load regulation characteristic diagram.

As a result, as indicated by a characteristic A in FIG. 6, the constant-voltage power supply circuit 10A in the first embodiment can improve the characteristic to one featuring a considerably milder voltage drop as compared with the characteristic B of the constant-voltage power supply circuit illustrated in FIG. 5. FIG. 6 illustrates that the value of the output voltage changes from VR2 to VR2' at a point at which the output current is I2 and thus FIG. 6 tells that the value of a load regulation characteristic LRa of the constant-voltage power supply circuit 10A is greatly improved.

Second Embodiment

Figure 2:
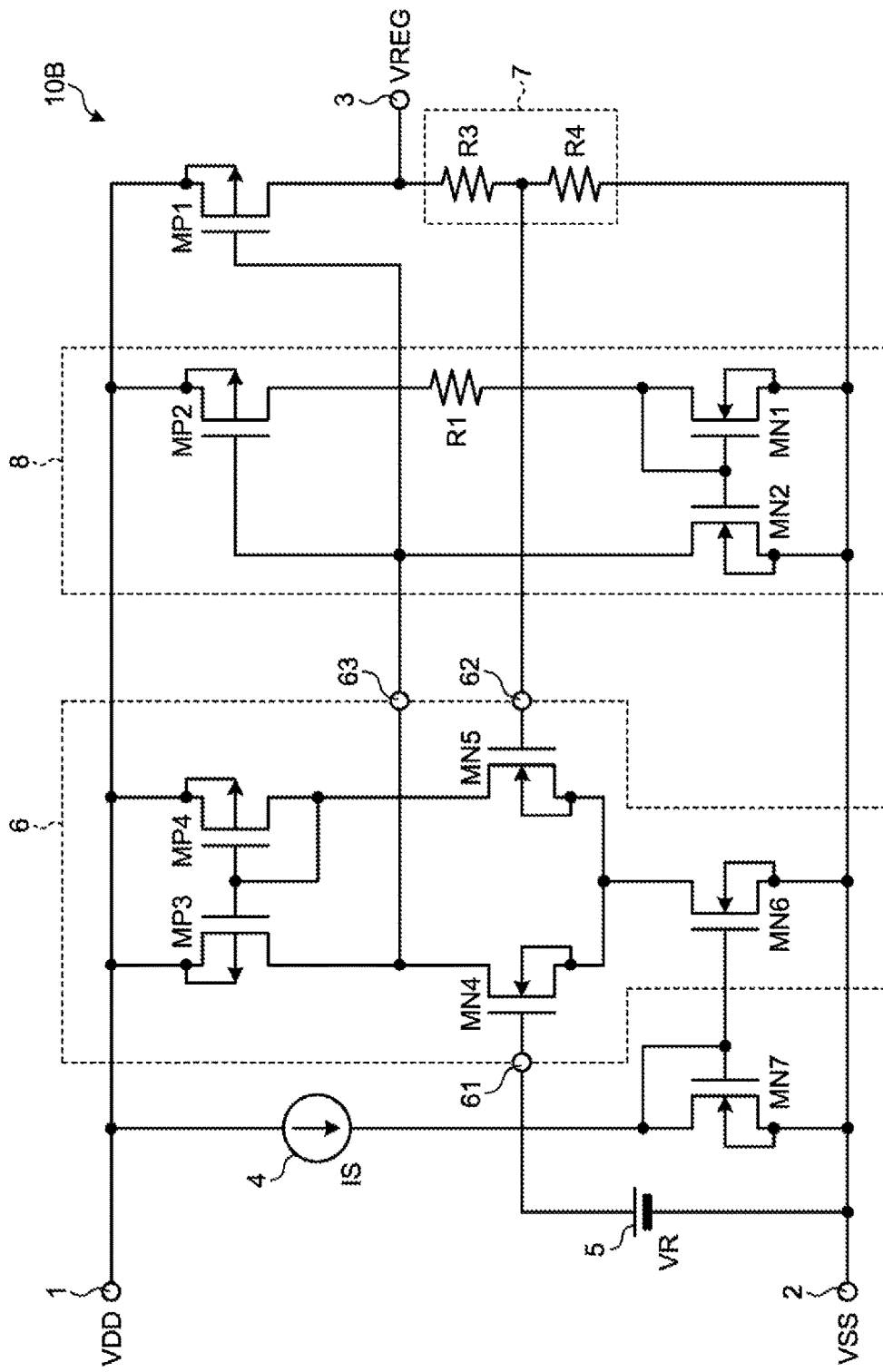
FIG. 2 is a circuit diagram of a constant-voltage power supply circuit according to a second embodiment of the present invention.

FIG. 2 illustrates a constant-voltage power supply circuit 10B according to a second embodiment of the present invention. The constant-voltage power supply circuit 10A of the first embodiment described with reference to FIG. 1 is configured such that positive feedback is applied to the output terminal 63 of the error amplifier 6 using the current generated from the voltage at the output terminal 63 of the error amplifier 6. This configuration can entail a risk of oscillation depending on an amount of feedback.

In the constant-voltage power supply circuit 10B of the second embodiment illustrated in FIG. 2, a resistor R1 is inserted between a drain of a transistor MP2 and a drain of a transistor MN1 of a positive feedback circuit 8. This arrangement reduces the amount of feedback to an output terminal 63 of an error amplifier 6 when a drain current of the transistor MP2 is greatly increased (at which an output current of a transistor MP1 increases likewise), so that the risk of oscillation can be reduced.

Third Embodiment

Figure 3:
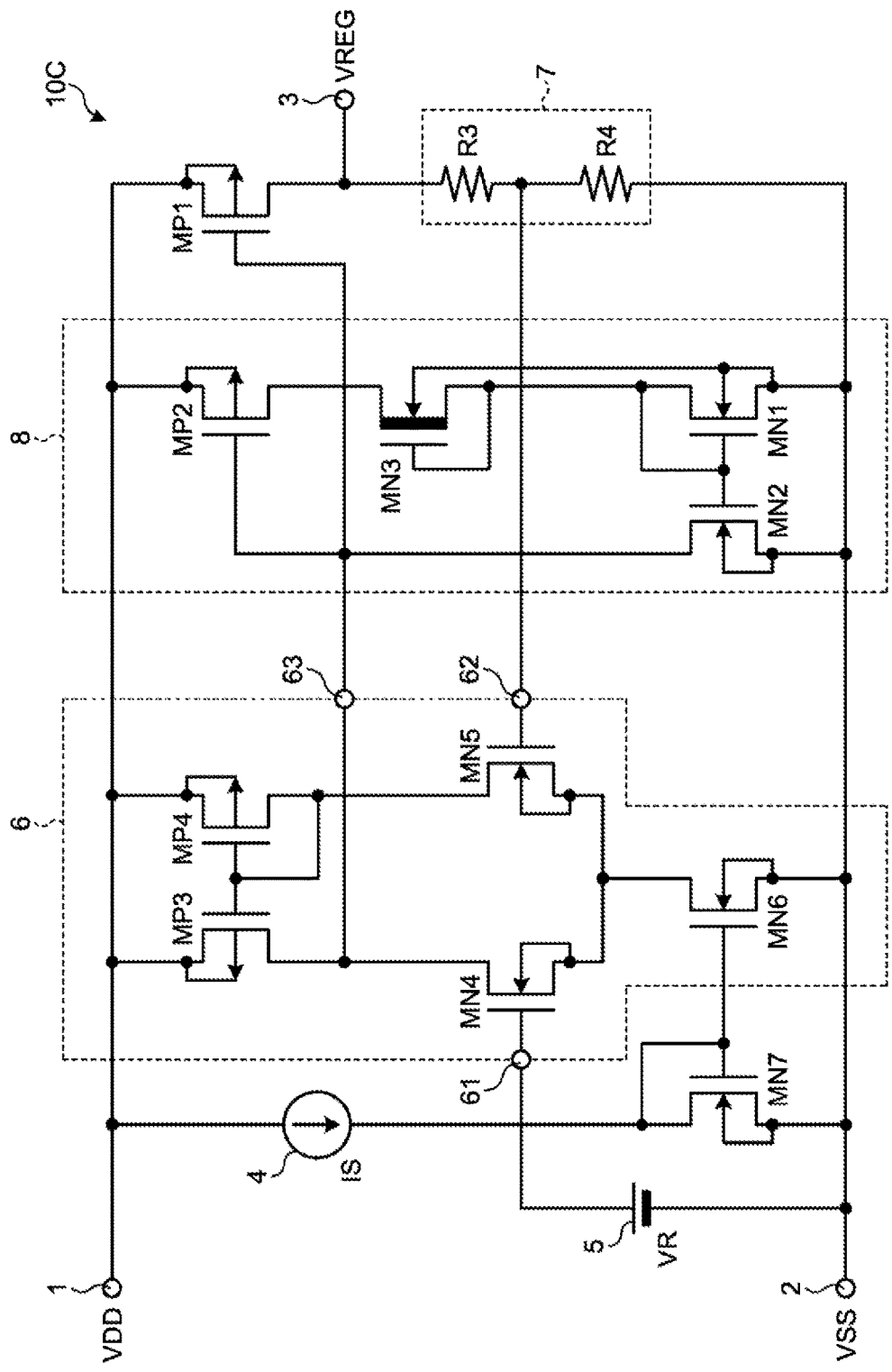
FIG. 3 is a circuit diagram of a constant-voltage power supply circuit according to a third embodiment of the present invention.

FIG. 3 is a circuit diagram of a constant-voltage power supply circuit 10C according to a third embodiment of the present invention when the risk of oscillation cannot be reduced by the constant-voltage power supply circuit 10B of the second embodiment in which the resistor R1 is inserted to be connected to the positive feedback circuit 8 as described with reference to FIG. 2, a depletion type NMOS transistor MN3 with a gate-source connection established is inserted to be connected in place of the resistor R1 as illustrated in FIG. 3.

The foregoing configuration causes a drain current flowing through a transistor MP2 to increase, so that a drain voltage of the transistor MN3 builds up. This increase a potential difference between a source and a back gate of the transistor MN3. As a result, a back gate effect of the transistor MN3 causes a threshold voltage of the transistor MN3 to increase, so that resistance between the drain and the source further increases. The foregoing allows the amount of feedback to an error amplifier 6 to be reduced further when a transistor MP1 flows a large output current.

From the foregoing discussion, the risk of oscillation can be further reduced as compared with the constant-voltage power supply circuit 10B described with reference to FIG. 2. It is noted that a threshold voltage Vth of the NMOS transistor MN3 is given by expression (3) that represents an expression of the back gate effect:

$$Vth = Vth0 + \gamma(\sqrt{|2\phi_F + V_{SB}|} - \sqrt{|2\phi_F|}) \quad (3)$$

Where, Vth0 denotes a threshold voltage at zero bias, $\gamma$ denotes a substrate effect coefficient, $V_{SB}$ denotes a voltage across the source and the back gate, and $\phi_F$ denotes a Fermi level in a P-type substrate.

Fourth Embodiment

Figure 4:
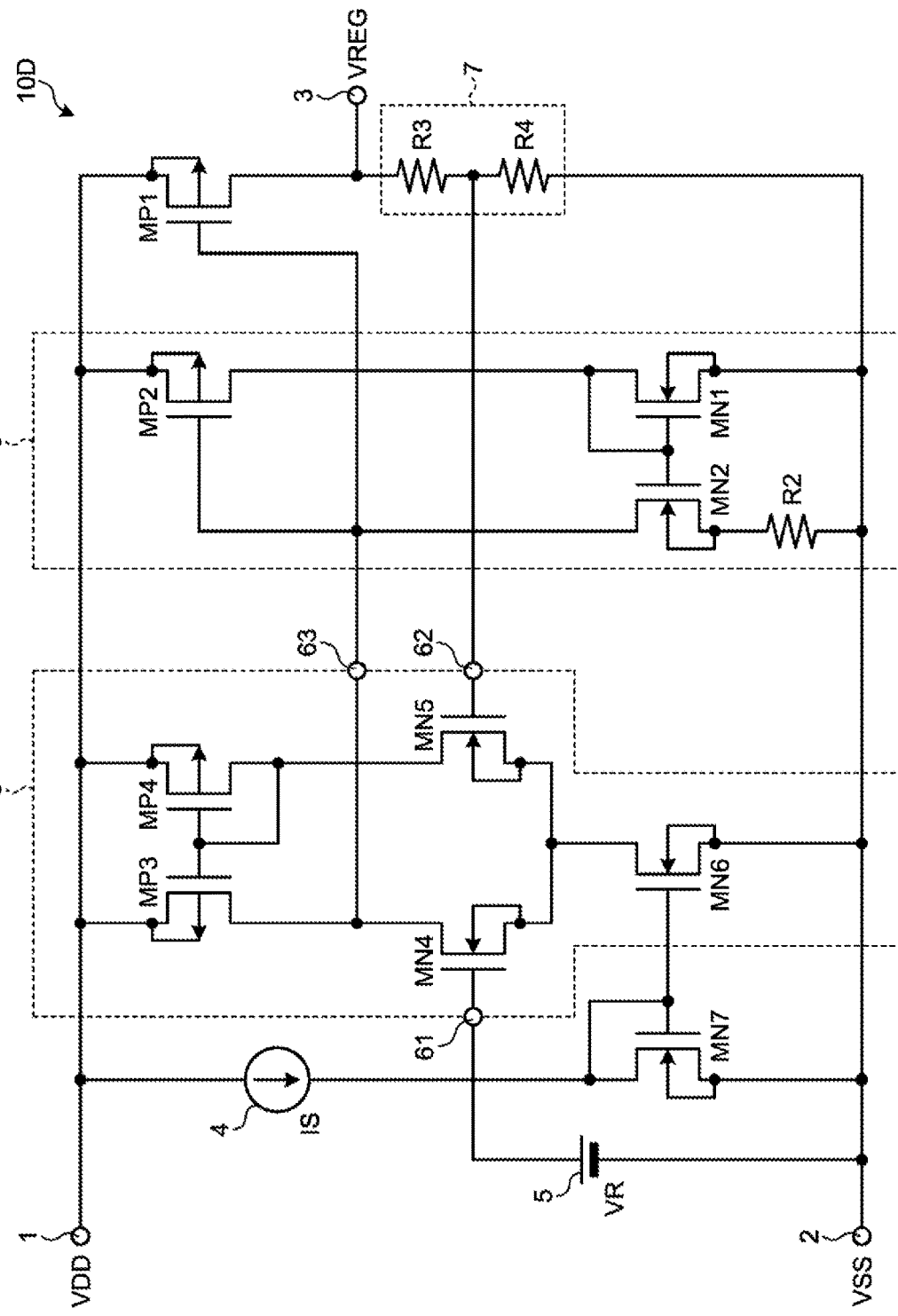
FIG. 4 is a circuit diagram of a constant-voltage power supply circuit according to a fourth embodiment of the present invention.

FIG. 4 is a circuit diagram of a constant-voltage power supply circuit 10D according to a fourth embodiment of the present invention. In the fourth embodiment, a resistor R2 is inserted between the power supply terminal 2 and the source/back gate terminal of the transistor MN2 on the output side of the positive feedback circuit 8 in the constant-voltage power supply circuit 10A described with reference to FIG. 1, to thereby achieve current limiting. In this case, too, as with the constant-voltage power supply circuits 10B and 10C described with reference to FIGS. 2 and 3, respectively, the amount of feedback to an error amplifier 6 can be reduced when a transistor MP1 flows a large output current.

Other Embodiments

The foregoing embodiments have been described for a case in which the power supply voltages satisfy the condition of VDD>VSS. When a high-low relation between the power supply voltages is reversed, the necessary approach is to replace the PMOS transistor with the NMOS transistor, and vice versa. In addition, the appended claims name a first one of the PMOS transistor and the NMOS transistor as a first conductivity type and a second one of the PMOS transistor and the NMOS transistor as a second conductivity type.

The aspect of the present invention can improve the load regulation characteristic by inserting a positive feedback circuit to be connected between the output terminal of the error amplifier and the gate of the first transistor of the first conductivity type as the output transistor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A constant-voltage power supply circuit, comprising:
   an error amplifier comprising an inverting input terminal and a noninverting input terminal and comprising a differential circuit;
   a reference voltage source connected to the inverting input terminal of the error amplifier;
   a first conductivity-type output first transistor having: a source connected to a first power supply terminal, a drain connected to a circuit output terminal, and a gate connected to an output terminal of the error amplifier; and
   an output voltage detecting circuit connected between the circuit output terminal and a second power supply terminal, the output voltage detecting circuit detecting voltage of the circuit output terminal to apply the detected voltage to the noninverting input terminal of the error amplifier, the constant-voltage power supply circuit further comprising:
   a positive feedback circuit connected between the output terminal of the error amplifier and the gate of the first conductivity-type first transistor, an input terminal and an output terminal of the positive feedback circuit being a same terminal, the input terminal and the output terminal of the positive feedback circuit being connected to the gate of the first conductivity-type output first transistor, the input terminal and the output terminal of the positive feedback circuit being directly connected to the output terminal of the error amplifier.

2. The constant-voltage power supply circuit according to claim 1, wherein
   the positive feedback circuit includes:
   a first conductivity-type second transistor having: a gate connected to the output terminal of the error amplifier, and a source connected to the first power supply terminal;
   a second conductivity-type first transistor having: a drain and a gate connected to a drain of the first conductivity-type second transistor, and a source connected to the second power supply; and
   a second conductivity-type second transistor having: a drain connected to the output terminal of the error amplifier, a source connected to the second power supply terminal, and a gate connected to the gate of the second conductivity-type transistor.

3. The constant-voltage power supply circuit according to claim 2, further comprising:
   a first resistor inserted to be connected between the drain of the first conductivity-type second transistor and the drain of the second conductivity-type first transistor.

4. The constant-voltage power supply circuit according to claim 2, further comprising:
   a second conductivity-type depletion transistor inserted to be connected between the drain of the first conductivity-type second transistor and the drain of the second conductivity-type first transistor, the second conductivity-type depletion transistor having a drain connected to the drain of the first conductivity-type second transistor, and the second conductivity-type depletion transistor further having a source and a gate each connected to the drain of the second conductivity-type first transistor.

5. The constant-voltage power supply circuit according to claim 2, further comprising:
   a resistor inserted to be connected between the source of the second conductivity-type second transistor and the second power supply terminal.

* * * * *